United States Patent
Nishikawa et al.

(10) Patent No.: US 7,852,333 B2
(45) Date of Patent: *Dec. 14, 2010

(54) THREE-DIMENSIONAL VOLUMETRIC DISPLAY APPARATUS AND METHOD

(75) Inventors: Osamu Nishikawa, Kanagawa (JP); Jun Miyazaki, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 932 days.

This patent is subject to a terminal disclaimer.

(21) Appl. No.: 11/251,871

(22) Filed: Oct. 18, 2005

(65) Prior Publication Data

US 2006/0266135 A1 Nov. 30, 2006

(30) Foreign Application Priority Data

May 31, 2005 (JP) .............................. P2005-160118

(51) Int. Cl.
*G06T 17/00* (2006.01)

(52) U.S. Cl. ................. 345/419; 345/6; 345/156; 382/284; 353/7; 353/31; 353/94

(58) Field of Classification Search ................. None
See application file for complete search history.

(56) References Cited

U.S. PATENT DOCUMENTS

| | | | | |
|---|---|---|---|---|
| 3,619,065 | A * | 11/1971 | Agnew | 356/604 |
| 3,773,404 | A * | 11/1973 | Moore | 359/785 |
| 5,394,202 | A * | 2/1995 | Deering | 353/7 |
| 5,945,966 | A * | 8/1999 | Acantilado | 345/6 |
| 6,462,840 | B1 * | 10/2002 | Kravtsov | 358/474 |
| 6,625,088 | B1 * | 9/2003 | Mah et al. | 368/76 |
| 6,700,563 | B1 * | 3/2004 | Koizumi | 345/156 |
| 7,058,239 | B2 * | 6/2006 | Singh et al. | 382/284 |
| 7,125,122 | B2 * | 10/2006 | Li et al. | 353/31 |
| 2007/0247595 | A1 * | 10/2007 | Refai et al. | 353/94 |
| 2008/0013049 | A1 | 1/2008 | Nishikawa | |

FOREIGN PATENT DOCUMENTS

| | | | |
|---|---|---|---|
| JP | 63-113518 A | | 5/1988 |
| JP | 02-178720 | * | 7/1990 |
| JP | 04-014086 | * | 1/1992 |
| JP | 5-249428 A | | 9/1993 |

(Continued)

OTHER PUBLICATIONS

English translation of: JP 2004-004358—Projection-Type Display—Masanori Kashiwagi. USPTO. Jun. 2009.*

(Continued)

*Primary Examiner*—Kimbinh T. Nguyen
(74) *Attorney, Agent, or Firm*—Sughrue Mion, PLLC

(57) ABSTRACT

A volumetric display apparatus, includes: a volumetric shape model having a side surface and an upper surface; a reflection mirror disposed at the side surface; a control device which stores image information of surface textures of the upper surface and the side surface; and a projector that projects an image of the surface texture of the upper surface onto the upper surface and which projects an image of the surface texture of the side surface onto the side surface via the reflection mirror, based on the image information from the control device.

18 Claims, 10 Drawing Sheets

FOREIGN PATENT DOCUMENTS

| | | |
|---|---|---|
| JP | 08-205197 A | 8/1996 |
| JP | 2000-10194 A | 1/2000 |
| JP | 2000-352695 A | 12/2000 |
| JP | 2001-514767 A | 9/2001 |
| JP | 2002-139700 * | 5/2002 |
| JP | 2003-131319 A | 5/2003 |
| JP | 2004-4358 A | 1/2004 |
| JP | 2005-70687 A | 3/2005 |
| JP | 2005-252914 A | 9/2005 |
| JP | 2006-085135 A | 3/2006 |
| JP | 2006-308962 A | 11/2006 |

OTHER PUBLICATIONS

Telecentric lens. Wikipedia. Dec. 10, 2009.*
Foley et al. Fundamentals of Interactive Computer Graphics. Addison-Wesley Publishing Company. Mar. 1983.*
Japanese Office Action dated Nov. 18, 2008.
Tsutomu Miyasato et al., An evaluation of virtual space teleconferencing system based on detection of objects pointed through a virtual space, IEICE Transactions Japanese edition, May 1997, 1221-1230, vol. J80-D-11, No. 5, Japan.

* cited by examiner

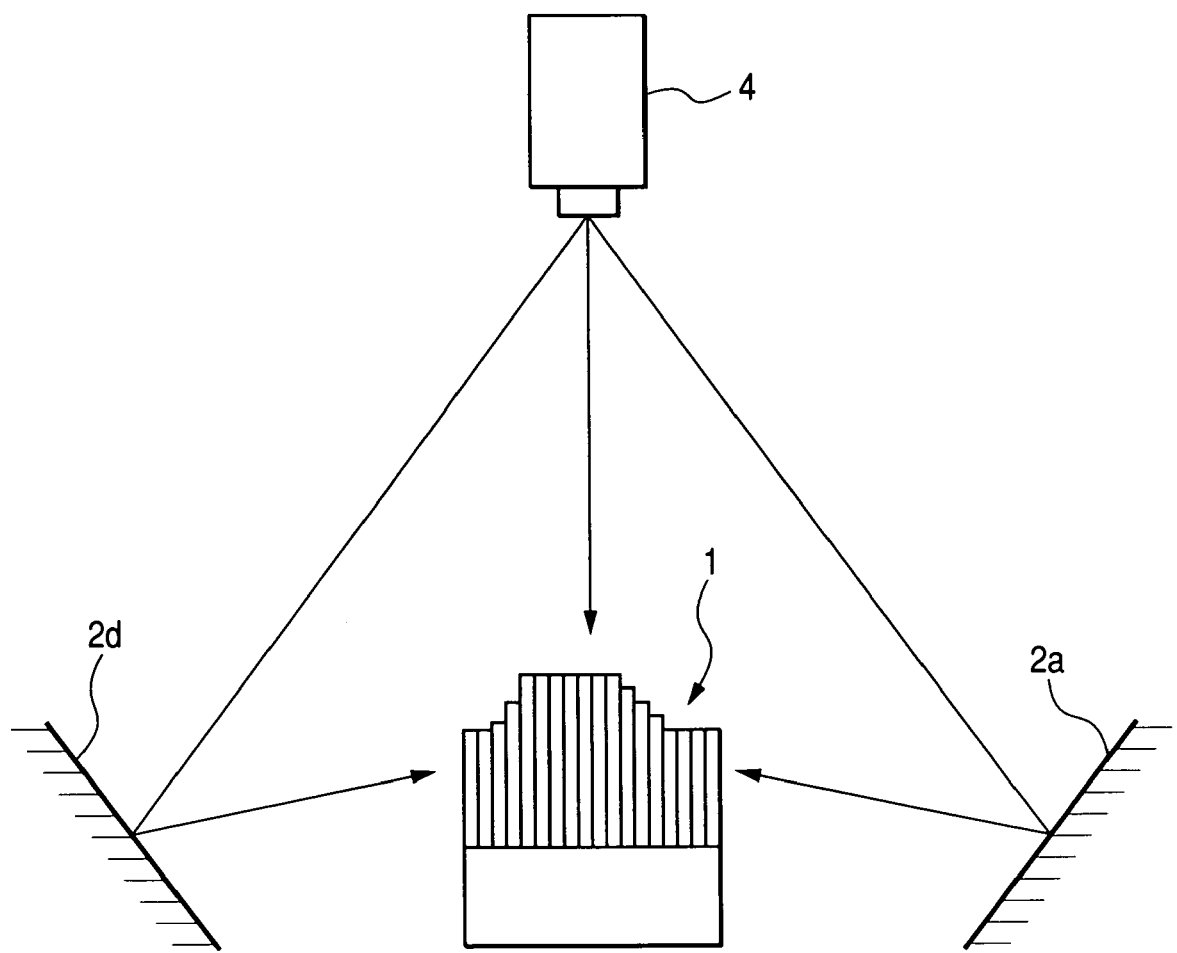

THREE-DIMENSIONAL VOLUMETRIC DISPLAY APPARATUS AND METHOD

BACKGROUND OF THE INVENTION

1. Field of the Invention

The present invention relates to a three-dimensional volumetric display apparatus, and more particularly, to a three-dimensional volumetric display apparatus which projects a surface texture image of a volumetric shape model onto the volumetric shape model to perform three-dimensional volumetric display.

2. Background Art

When plural people discuss any one subject, a conference has been actively held due to collaboration which can obtain a better result by sharing information, intention, or idea with one another. At this time, for the purpose of exhibiting data in a visible and understandable form, an opportunity of using a three-dimensional volumetric display (three-dimensional volumetric display device) has increased.

A stereoscopic display technology has been suggested in various forms. As a representative example, there are the following polarizing glasses or a lenticular method.

The polarizing glasses mainly apply to a projection type stereoscopic display. Using two projectors, a left parallax image is projected onto a screen by one projector in a vertical deflection state and a right parallax image is projected onto the screen by the other projector in a horizontal deflection state. Provided are glasses in which a deflection filer for transmitting horizontally deflected light and blocking vertically deflected light is attached to a right lens and a deflection filter for transmitting vertically deflected light and blocking the horizontally deflected light is attached to a left lens. These glasses can cause an object to be stereoscopically viewed because the left parallax image is incident to a left eye and the right parallax image is incident to a right eye. In this method, since special glasses such as the polarization glasses must be used, there is a problem that a natural work style may be damaged. Furthermore, since only a stereo image viewed from any view point is displayed and parallax is not varied although a position of the eye is changed, there is a problem that stereoscopic display is observed with incongruity.

Furthermore, the lenticular method mainly applies to a stereoscopic display liquid crystal panel. An object is stereoscopically viewed by installing a lenticular lens for covering two pixels at the front side of the liquid crystal panel in an array, enabling a pixel for displaying a left parallax image to be incident to a left eye, and enabling a pixel for displaying a right parallax image to be incident to a right eye. In this method, there is a merit that special glasses are not needed. However, since parallax is not varied, there is a problem that stereoscopic display is observed with incongruity, similar to the polarization glasses. Since a distance between a point which can be stereoscopically viewed (eye position) and an optimal position is very narrow, for example, about ±10 mm, the eye must be always fixed to any position, and thus eyestrain or physical fatigue is apt to occur. In addition, simultaneous stereoscopic viewing is limited to each individual person and information on data can not be shared with participants.

As such, the polarization glasses or the lenticular method is not suitable as the stereoscopic display method for the collaboration which is performed by many people. Accordingly, a volumetric display method which can display an object as if the object is placed there wherever viewing the object has been suggested. Several representative examples are as follows.

First, a laminated cross-sectional projection method (Patent Document 1) laminates liquid crystal cells of a transparent state or a diffusion state by electrical driving and sequentially projects a cross-sectional image of a display object by a projection device only one liquid crystal cell is in the diffusion state and the other liquid crystal cells are in the transparent state. The liquid crystal cell of the diffusion state is electrically scanned in sequential and corresponding cross-sectional image is projected by the projection device in synchronization with the scan, thereby performing three-dimensional volumetric display. In this method, since the projected image is the cross-sectional image, it is not possible to represent a surface texture. In addition, the displayed stereoscopic image becomes a phantom image in which an inner image is viewed and thus the object is stereoscopically displayed different from an actual object.

Furthermore, a method of displaying a three-dimensional shape with a plurality of pins (Patent Document 2) arranges the plurality of pins each having an actuator for vertically sliding the pin in a matrix and vertically moves the plurality of pins by control of a computer, thereby displaying the three-dimensional shape. Also, the pin is formed of a transparent material, a figure is formed on a pin substrate by display from a lower side of the substrate of a pin matrix for displaying the shape, and the pin matrix is viewed from an upper side to identify the figure. In this method, it is not possible to efficiently represent a surface texture of an object.

In addition, a method of vertically moving a plurality of image display elements (Patent Document 3) vertically moves the plurality of image display elements arranged in two dimensions in an arrangement surface based on three-dimensional information, changes the arrangement surface, and emits light from the surface with desired color and brightness. Also, a display surface of the image display element is covered by a screen and the color and brightness signals of each image display element are projected onto the screen. Even in this method, it is not possible to efficiently represent a surface texture of an object.

[Patent document 1] JP-A-2002-139700

[Patent document 2] Japanese Patent Publication No. 2736908

[Patent document 3] Japanese Patent Publication No. 3127447

SUMMARY OF THE INVENTION

Accordingly, the present invention provides a three-dimensional volumetric display device which can efficiently represent a surface texture of an object on a volumetric shape model.

The invention may provide a volumetric display apparatus, including: a volumetric shape model having a side surface and an upper surface; a reflection mirror disposed at the side surface; a control device which stores image information of surface textures of the upper surface and the side surface; and a projector that projects an image of the surface texture of the upper surface onto the upper surface and which projects an image of the surface texture of the side surface onto the side surface via the reflection mirror, based on the image information from the control device.

The invention may provide a volumetric display apparatus, including: a volumetric shape model including a shape varying element, the volumetric shape model having a side surface and an upper surface; a reflection mirror disposed at a side surface of the volumetric shape model; a control device which stores shape information of the volumetric shape model and image information of surface textures of the upper surface and the side surface; a shape varying element driving device that drives the shape varying element based on the shape information; and a projector that projects an image of the surface texture of the upper surface onto the upper surface and that projects an image of the surface texture of the side surface onto the side surface via the reflection mirror, based on the image information.

The invention may provide a volumetric display apparatus, including: a volumetric shape model having a side surface and an upper surface; a reflection mirror disposed at the side surface; a control device that stores shape information of the volumetric shape model and image information of surface textures of the upper surface and the side surface; and a projector that projects an image of surface texture of the upper surface onto the upper surface and that projects an image of surface texture of the side surface onto the side surface of the volumetric shape model through the reflection mirror, based on the image information from the control device; wherein the control device stores a geometrical installation condition of the volumetric shape model as an installation parameter and controls the image information of the surface textures of the volumetric shape model based on the installation parameter.

The invention may include a volumetric display method, including: projecting a surface texture image of an upper surface of a volumetric shape model onto the upper surface, based on image information of surface texture of the upper surface; and projecting a surface texture image of a side surface of the volumetric shape model onto the side surface through a reflection mirror, based on image information of surface texture of the side surface.

BRIEF DESCRIPTION OF THE DRAWINGS

The present invention may be more readily described with reference to the accompanying drawings:

FIG. 6 illustrates relative positional relationships among the volumetric shape model, the projector, and the reflection mirror;

FIGS. 10(a) and (b) illustrate a difference depending on a kind of a projection lens of the projector, wherein FIG. 10(a) illustrates a case where an extended projection lens system is installed.

DETAILED DESCRIPTION OF THE EMBODIMENTS

Hereinafter, an embodiment of the present invention will be described with reference to the attached drawings.

Figure 1:
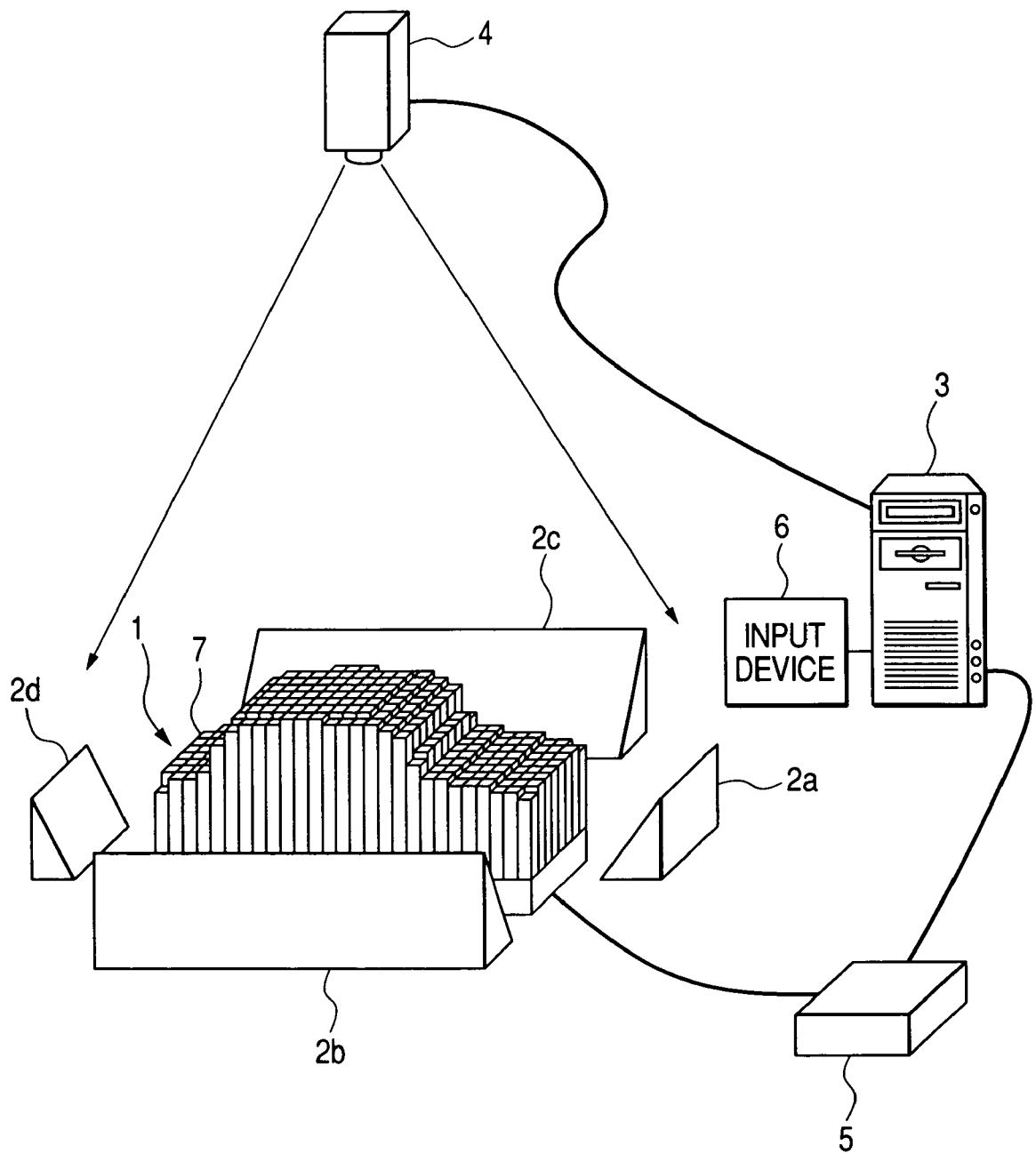
FIG. 1 illustrates a configuration of a volumetric display device according to an embodiment of the present invention.

FIG. 1 illustrates a configuration of a volumetric display device according to an embodiment of the present invention. As shown, the present embodiment includes a volumetric shape model 1, reflection mirrors 2a to 2d disposed at the side surfaces of the volumetric shape model 1, a control device 3 for storing image information of surface textures of the upper surface and the side surfaces of the volumetric shape model, and a projector 4 which directly projects a surface texture image of the upper surface of the volumetric shape model 1 onto the volumetric shape model 1 and projects surface texture images of the side surfaces of the volumetric shape model 1 onto the volumetric shape model 1 through the reflection mirrors 2a to 2d, based on the image information from the control device 3. The control device 3 may be composed of a computer such as a personal computer (PC) and connected with an input device 6 such as a mouse or a joystick for good operability.

Here, the volumetric shape model 1 may use, for example, a method of restoring a shape by arranging shape a plurality of varying elements such as prisms (pin) 7 in a matrix and controlling the heights thereof (pin matrix method), or a method of restoring a rough shape by a stereolithography system using photocuring resin (not shown) (molding model method).

In the present embodiment, the pin matrix method using the plurality of prisms will be described. The pin matrix is known, for example, as disclosed in the Patent Document 2. In the present invention, the volumetric shape model 1 need not be represented with a precise shape, that is, with only precision of 2 to 3% of a total scale. For example, in order to represent a mechanical part having a size of 100 mm in three dimensions, a prism having a cross section of 2 mm to 3 mm may be used. It is preferable that the prism (pin) 7 is formed of a material of diffusing and reflecting light. If the prism 7 is formed of a transparent or mirror surface material, the surface texture image projected by the projector is transmitted or significantly reflected and thus a sufficient surface texture can not be applied to the volumetric shape model 1.

In the case of using the pin matrix type volumetric shape model 1 as in the present embodiment, a shape varying element driving device 5 for driving the prisms (shape varying elements) 7 arranged in a matrix is provided. The shape varying element driving device 5 is connected to the control device 3 and the volumetric shape model 1 to receive three-dimensional shape information of the volumetric shape model 1 from the control device 3 and to vertically move the plurality of prisms (shape varying elements) forming the volumetric shape model 1 based on this information, thereby forming the volumetric shape model 1. In this case, by changing the image information of the surface texture and the shape information of the volumetric shape model 1 by the input device 6, the surface texture image and the shape of the volumetric shape model 1 can be dynamically changed.

Figure 2:
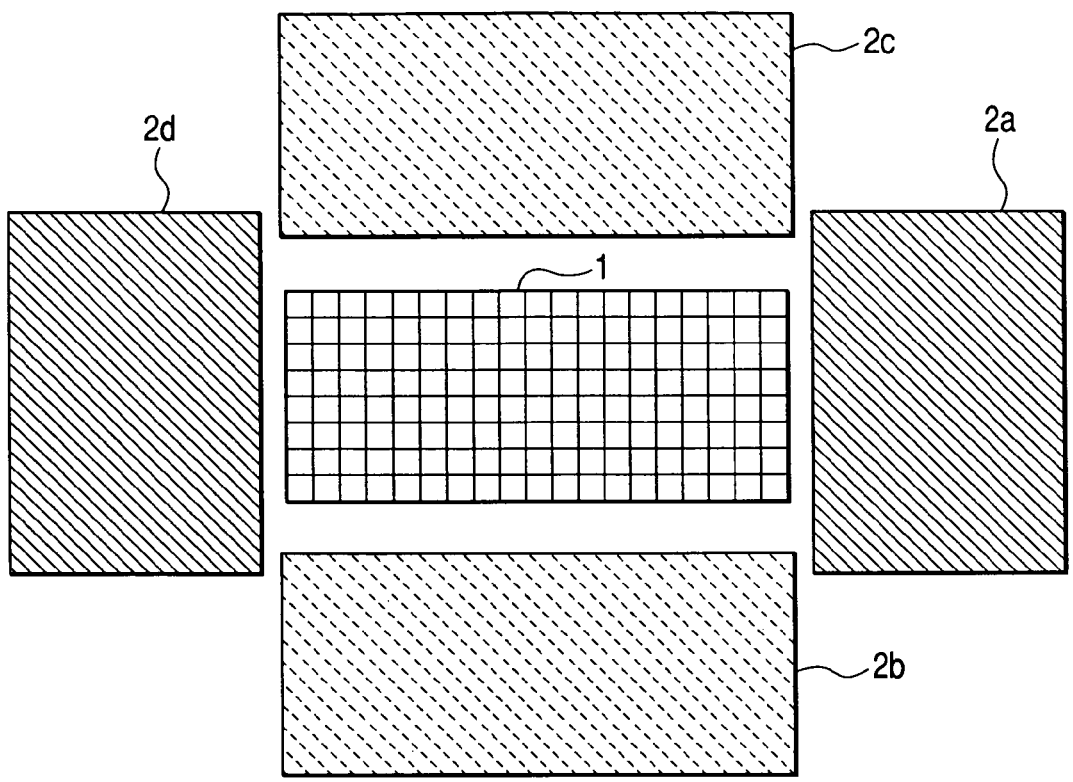
FIG. 2 is a view of a volumetric shape model and reflection mirrors viewed from the position of a lens of a projector.

FIG. 2 is a view of the volumetric shape model 1 and the reflection mirrors 2a to 2d viewed from the position of a lens of the projector 4. The upper surface of the volumetric shape model 1 is placed at the center of FIG. 2 and the reflection surfaces of the reflection mirrors 2a to 2d face each other at the respective side surfaces of the volumetric shape model 1, Here, it is preferable that the reflection mirrors 2a to 2d are composed of half mirrors. This is to prevent the volumetric shape model 1 from being not viewed from the side surfaces by installation of the reflection mirrors.

Figure 3:
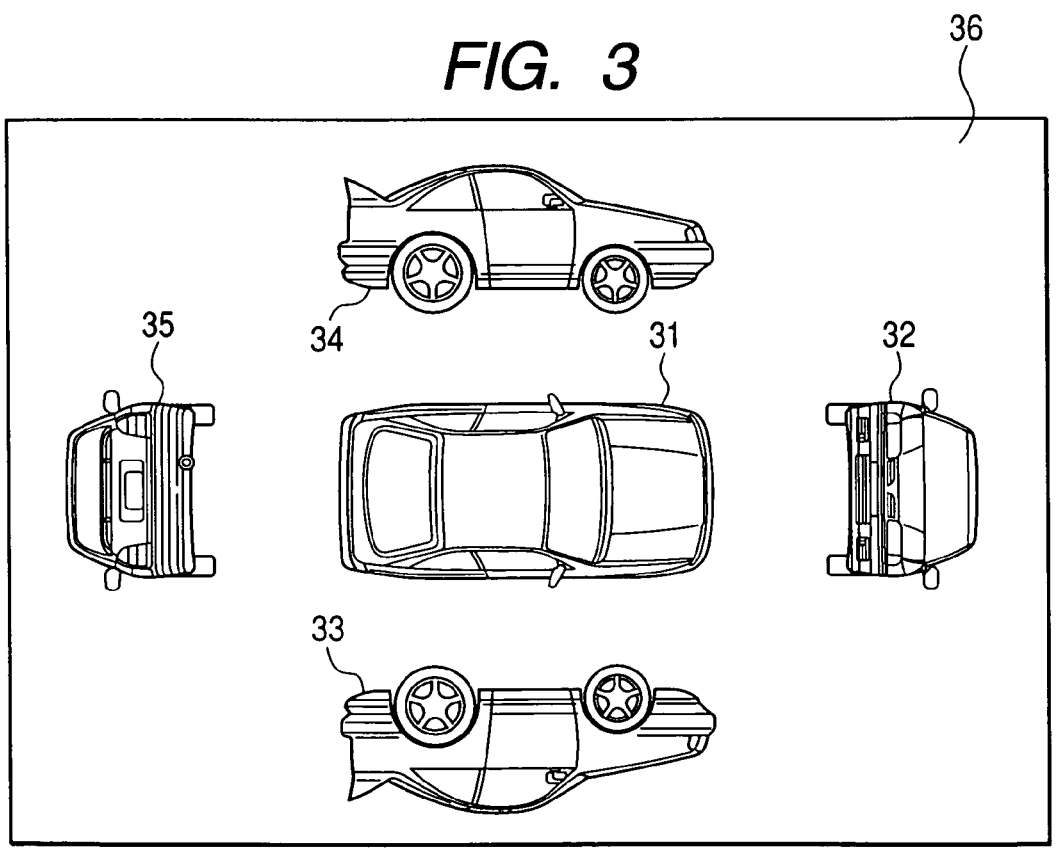
FIG. 3 illustrates an example of surface texture images of the upper surface and the side surfaces of the volumetric shape model.

FIG. 3 illustrates an example of the surface texture images of the upper surface and the side surfaces of the volumetric shape model 1. This example is the surface texture image of a vehicle and represents a color or a surface shape like a color picture. In this example, total five projected images including the surface texture image 31 of the upper surface and the surface texture images 32 to 35 of the left, right, front, and rear side surfaces are represented. These surface texture images are formed based on the image information from the control device 3. The projector 4 projects the surface texture images 31 to 35 onto the volumetric shape model 1 and the reflection mirrors 2a to 2d, respectively. In addition, it is preferable that, in the images projected by the projector 4, a portion 36 except the surface texture images is black. If the portion 36 is bright, the light leaks to the opposite side surface of the volumetric shape model 1 onto which the light is projected, and thus the volumetric shape model 1 can not be suitably observed.

Figure 4:
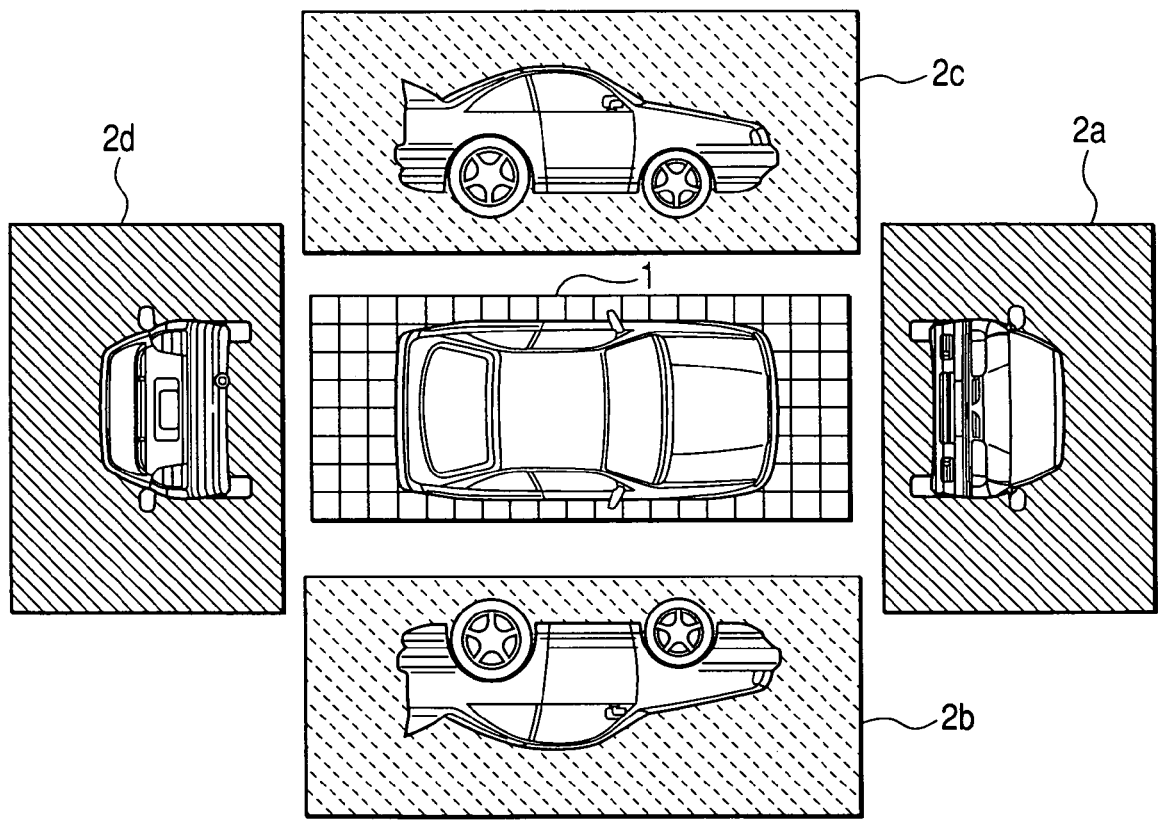
FIG. 4 illustrates the surface texture images projected onto the volumetric shape model and the reflection mirrors.

FIG. 4 illustrates the surface texture images projected onto the volumetric shape model 1 and the reflection mirrors 2a to 2d. The surface texture image 31 of the upper surface is projected onto the upper surface of the volumetric shape model 1 and the surface texture images 32 to 35 of the respective side surfaces are projected onto the reflection mirrors 2a to 2d of the respective side surfaces of the volumetric shape model 1.

Figure 5:
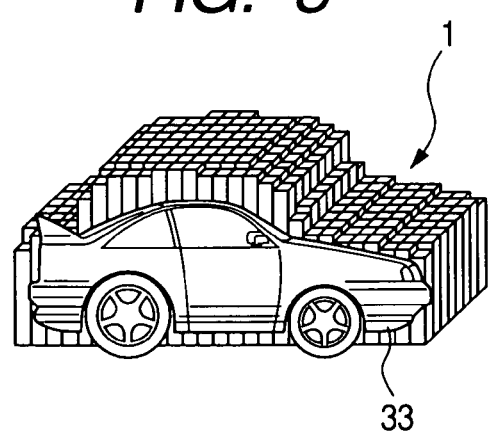
FIG. 5 illustrates a state where the surface texture image of the right side surface of a vehicle is projected onto the volumetric shape model by the reflection mirror.

FIG. 5 illustrates a state where the surface texture image 33 of the right side surface of the vehicle is projected onto the volumetric shape model 1 by the reflection mirror 2b. The surface texture image of the upper surface of the volumetric shape model 1 is directly projected onto the volumetric shape model 1 by the projector 4 and the surface texture images of the side surfaces of the volumetric shape model 1 are projected onto the volumetric shape model 1 through the reflection mirrors 2a to 2d. Thus, the texture of an object can be efficiently represented on the volumetric shape model.

As such, in the present embodiment, a volumetric shape model for roughly forming the shape of an object, a projector for projecting the texture images of the object, reflection mirrors for projecting the texture images onto the side surfaces of the volumetric shape model, a shape varying element driving device for driving pins (shape varying elements) arranged in a matrix of the volumetric shape model, and a control device for controlling the volumetric shape model and transmitting an projected image to the projector, such as a computer, are included. If an object which is desired to be stereoscopically displayed is CAD data which is modeled in three dimensions on a computer, a rough shape is formed as the volumetric shape model based on the three-dimensional model. In addition, in the case of an actual object, a rough shape can be formed as the volumetric shape model by inputting the shape in three dimensions, for example; using a shape measuring device.

The control device generates the shape by driving the shape varying element driving device based on data on the shape of the object and vertically moving each of the pins of the volumetric shape model. In addition, the control device previously measures positional relationships among the projector, the volumetric shape model, and the reflection mirrors, calculates parameters such as the positions, the sizes, and the rotation angles of the projected texture images, generates high precision texture images including a sheet of the projected image of the upper surface and four sheets of the projected images of the side surfaces, and projects the texture images onto the volumetric shape model by the projector.

FIG. 6 illustrates relative positional relationships among the volumetric shape model, the projector, and the reflection mirror. The projected image of the upper surface is directly projected onto the volumetric shape model by the projector and the projected images of the side surfaces are reflected from the four reflection mirrors 2a to 2d disposed in the vicinity of the volumetric shape model and are then projected onto the side surfaces of the volumetric shape model. The control device calculates the sizes, or the projected positions, and the slopes of the projected images of the side surfaces by slope angles of the reflection mirrors 2a to 2d, distances between the projector 4 and the reflection mirrors 2a to 2d, and distances between the reflection mirrors 2a to 2d and the volumetric shape model 1, and projects the generated projected images (surface texture images) by the projector 4. Thus, the projected images are not deviated from each other on the surface of the volumetric shape model 1. Since the projection distances of the projected images of the side surfaces are greater than that of the projected image of the upper surface, it is necessary to display the projected images of the side surfaces at a size smaller than that of the projected image of the upper surface. This is controlled by the control device. That is, any one of the sizes, the projected positions, and the slopes of the projected image of the upper surface and the projected images of the side surfaces can be controlled by the control device.

In the present invention, based on the image information of the surface textures of the upper surface and the side surfaces of the volumetric shape model, the surface texture image of the upper surface of the volumetric shape model is projected onto the upper surface of the volumetric shape model and the surface texture images of the side surfaces of the volumetric shape model are projected onto the side surfaces of the volumetric shape model through the reflection mirrors. The surface texture images of the side surfaces of the volumetric shape model are prepared in plural in correspondence with the side surfaces of the volumetric shape model and are projected onto the side surfaces of the volumetric shape model through a plurality of reflection mirrors to which the surface texture images of the plural side surfaces correspond. Furthermore, the surface texture image of the upper surface of the volumetric shape model and the surface texture images of the side surfaces of the volumetric shape model can be individually controlled by the above-described method in at least one of the size, the projected position, and the slope.

Figure 7A:
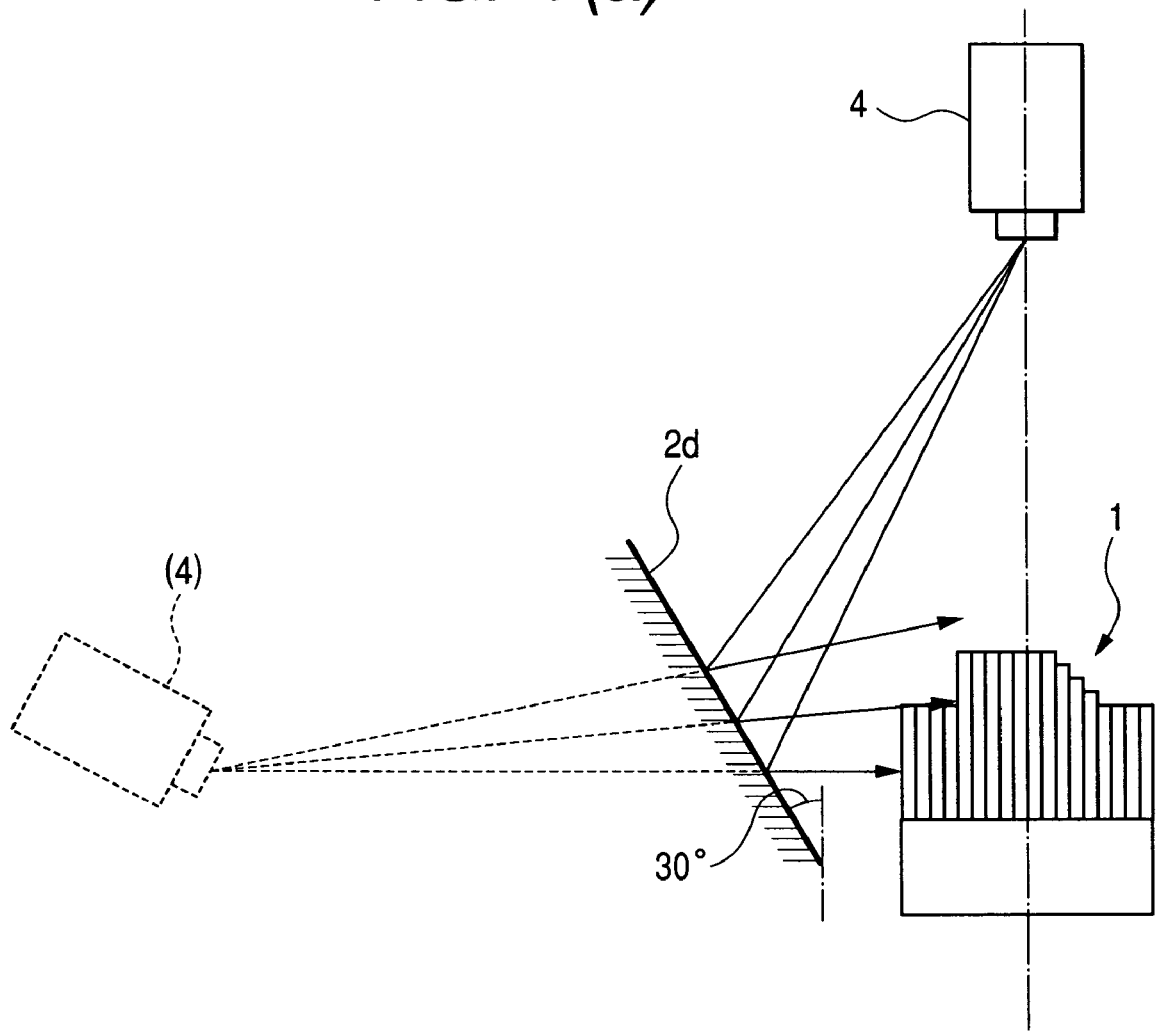
FIGS. 7(a) and 7(b) illustrate a shape of projected image of the side surface when the reflection mirror 2d is attached at an angle of about 30 degree with a vertical direction.
Figure 7B:
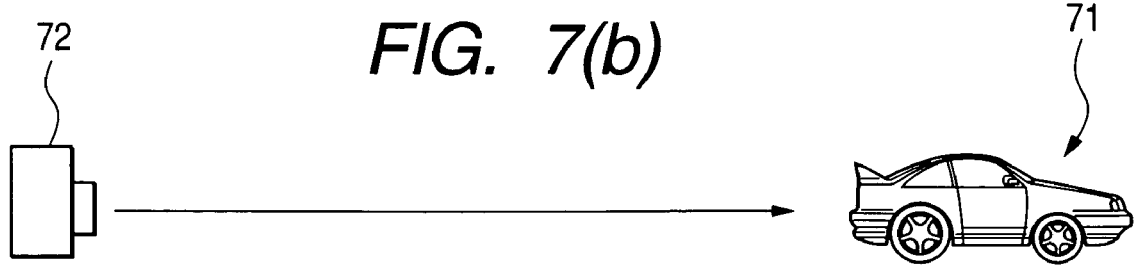

FIGS. 7(*a*) and 7(*b*) illustrate the shape of the projected image of the side surface when the reflection mirror 2d is attached at an angle of about 30 degree with a vertical direction. In this case, as can be seen from FIG. 7(*a*), the surface texture image from the projector 4 is projected from just the side surface of the volumetric shape model 1 through the reflection mirror 2d. Accordingly, even when the image of the side surface of an actual object 71 is photographed using a camera 72, as shown in FIG. 7(*b*), the actual object 71 should be photographed from the side surface of the actual object 71. The image of the side surface can be projected without being interrupted by the corner portion of the front side of the volumetric shape model 1.

Figure 8A:
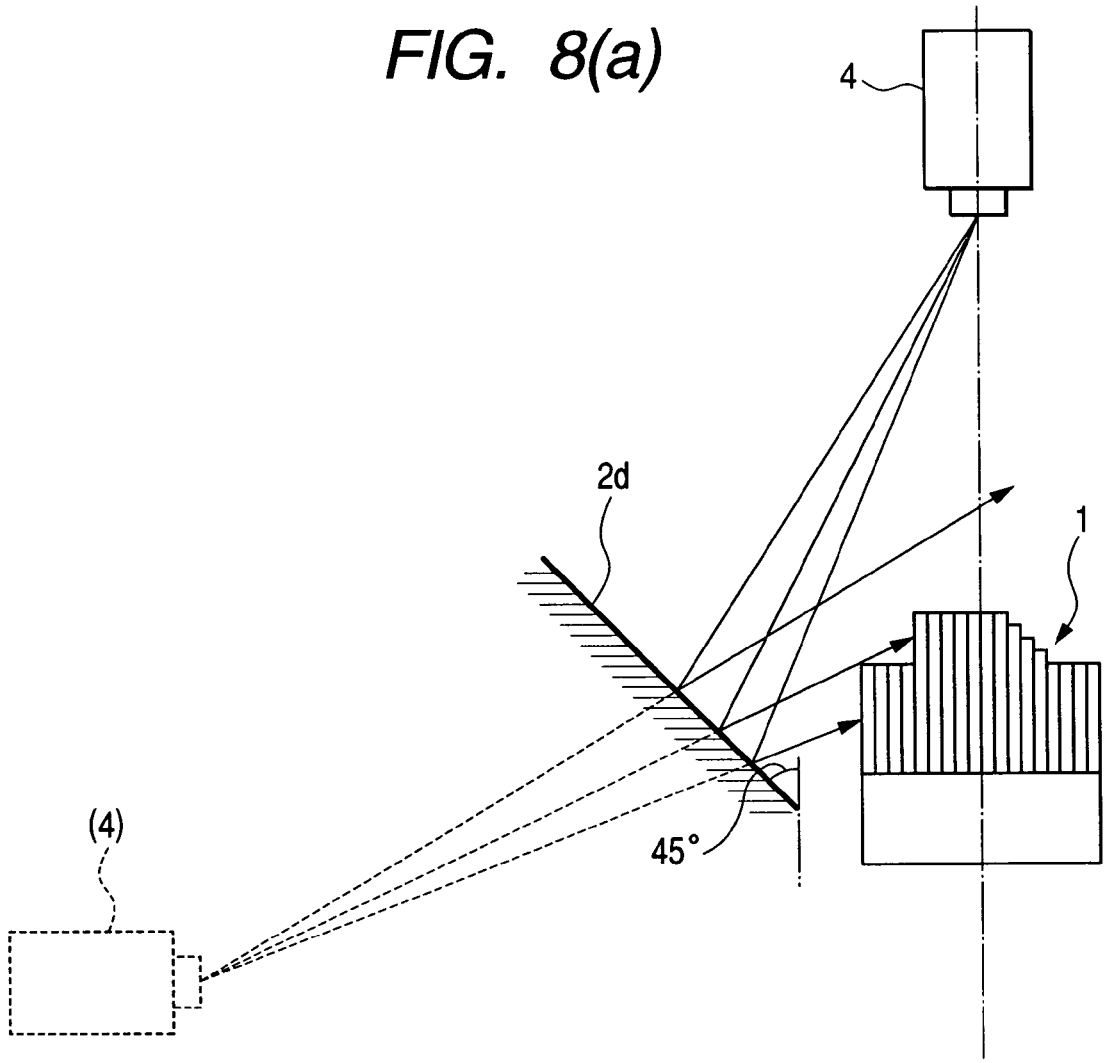
FIGS. 8(a) and 8(b) illustrate a shape of projected image of the side surface when the reflection mirror 2d is attached at an angle of about 45 degree with a vertical direction.
Figure 8B:
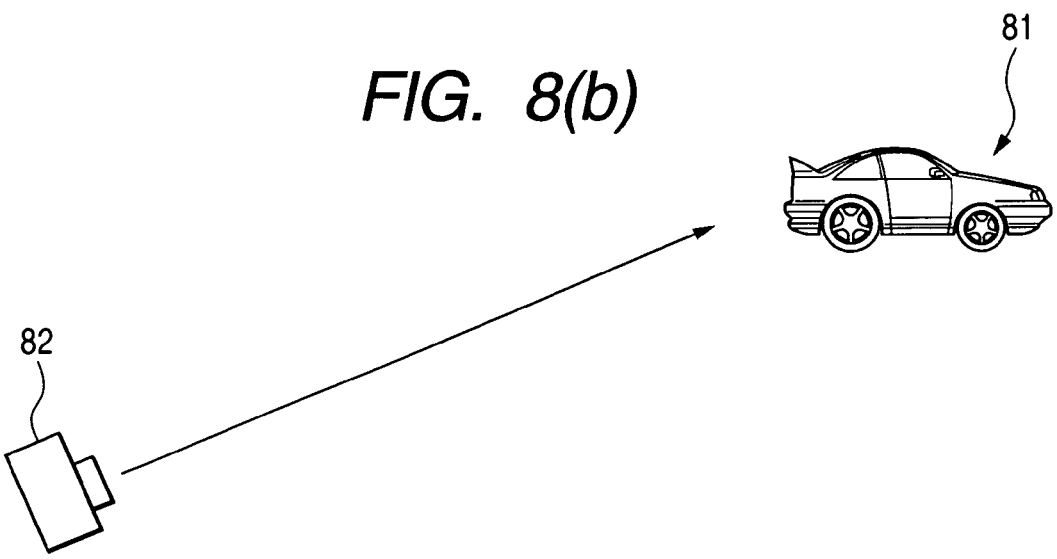

FIGS. 8(*a*) and 8(*b*) illustrate the shape of the projected image of the side surface when the reflection mirror is attached at an angle of about 45 degree with a vertical direction. In this case, as can be seen from FIG. 8(*a*), the surface texture image from the projector 4 is projected through the reflection mirror 2d as if the volumetric shape model 1 is viewed from the lower side. Accordingly, even when the image of the side surface of an actual object 81 is photographed using a camera 82, as shown in FIG. 8(*b*), the actual object 81 should be projected from the lower side. However, in this case, in order to project the volumetric shape model 1 from the lower side, a portion of the image of the side surface may be interrupted by the corner portion of the front side of the volumetric shape model 1 and thus may not be projected, in accordance with the volumetric shape model 1. Accordingly, in the case where the reflection mirror is installed such that the reflection surface thereof is sloped at an angle to the vertical direction, it is preferable that the reflection surface of the reflection mirror is sloped at an angle of 45 degree or less to the vertical direction.

Figure 9:
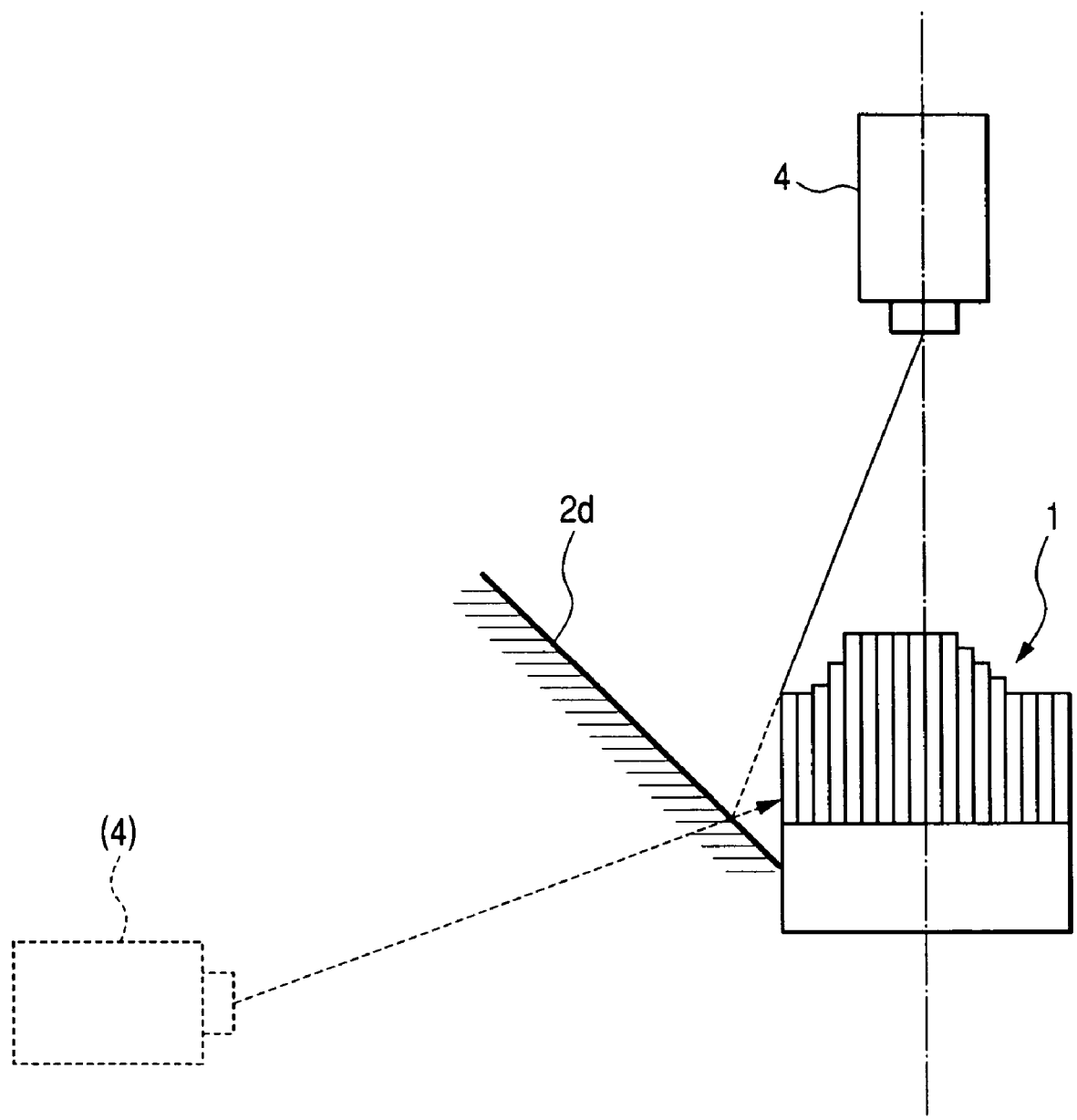
FIG. 9 illustrates a state where the reflection mirror is excessively close to the volumetric shape model.

FIG. 9 illustrates a state where the reflection mirror is excessively close to the volumetric shape model. As such, if the reflection mirror 2*d* is excessively close to the volumetric shape model 1, the image of the side surface is interrupted by the corner portion of the volumetric shape model 1 and thus can not be incident to the reflection mirror 2*d*. Accordingly, it is preferable that the reflection mirror and the volumetric shape model are installed at a predetermined interval.

Figure 10A:
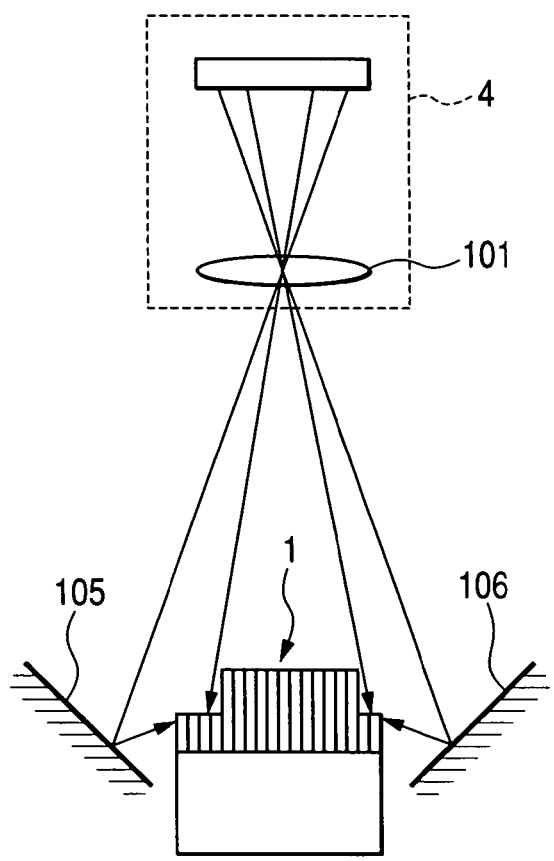
Figure 10B:
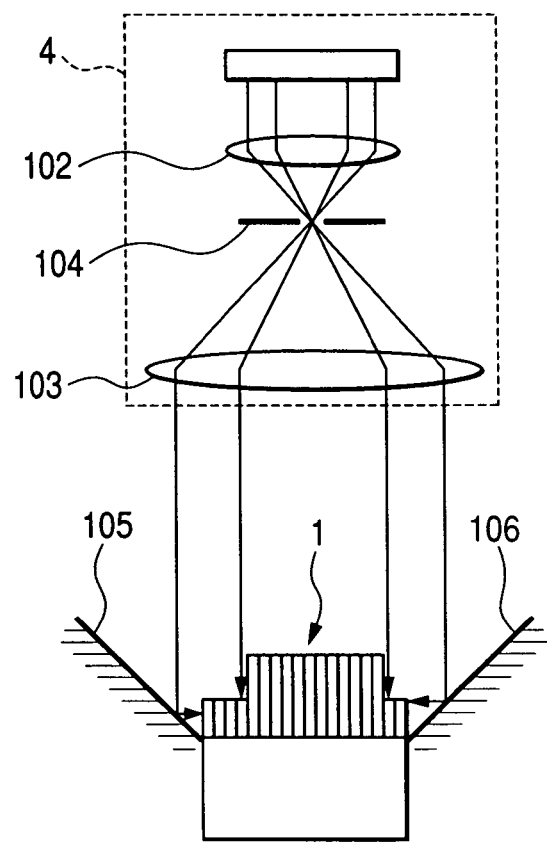
FIG. 10(b) illustrates a case where a telecentric projection lens system is installed.

FIG. 10 illustrates a difference depending on a kind of a projection lens of the projector, wherein (a) illustrates a case where an extended projection lens system is installed, and (b) illustrates a case where a telecentric projection lens system is installed. As shown in FIG. 10(*a*), in the case where a general extended projection system lens 101 is used as the projection lens, when the planar image is projected onto the volumetric shape model 1, the image can not be precisely projected over the entire surface by variation of the magnification of the projected image depending on a projection distance, interruption of a portion of the projected image by the corner portion of the front side of the volumetric shape model 1 in the case of the projection of side surface, or low depth of a projection focus. On the contrary, as shown in FIG. 10(*b*), for example, if the telecentric projection lens including an aperture stop 104 between lenses 102 and 103 is used, because the projection ray moves in the vertical direction of the volumetric shape model 1, the magnification of the projected image is not changed and thus a distortion does not occur in the projected image although a large step exists in the volumetric shape model 1. Furthermore, if the reflection mirror is sloped at an angle of 45 degree, since the projection ray of the side surface moves in a horizontal direction, the projected images of the upper surface and the side surfaces are not interrupted by the corner portion of the front side of the volumetric shape model 1. In addition, since the depth of the projection focus increases, the image can be projected onto any surface of the stereoscopic object.

Figure 11:
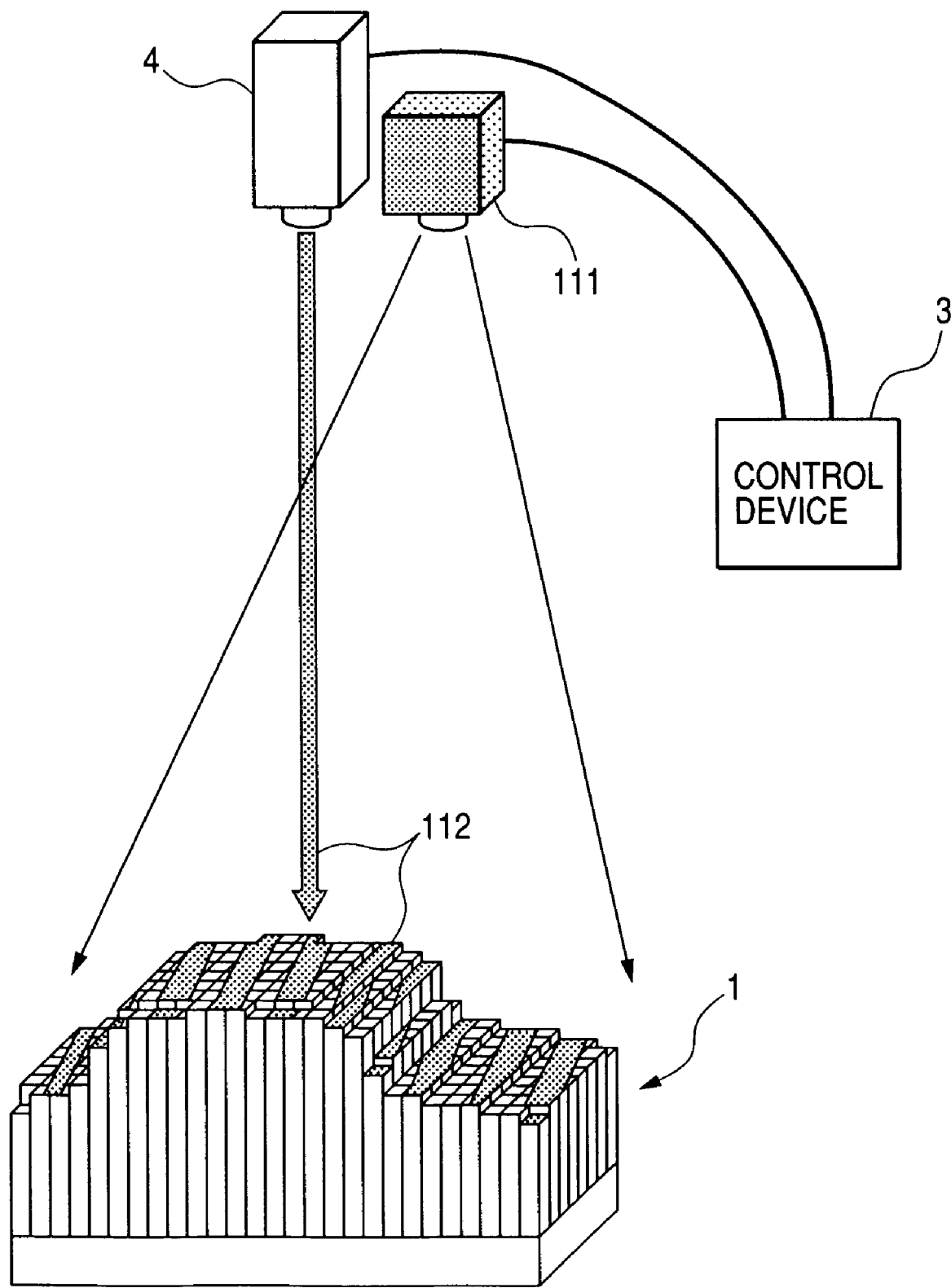
FIG. 11 illustrates a method of obtaining installation parameters (rotation, translation, and magnification) of the volumetric shape model.
Figure 12:
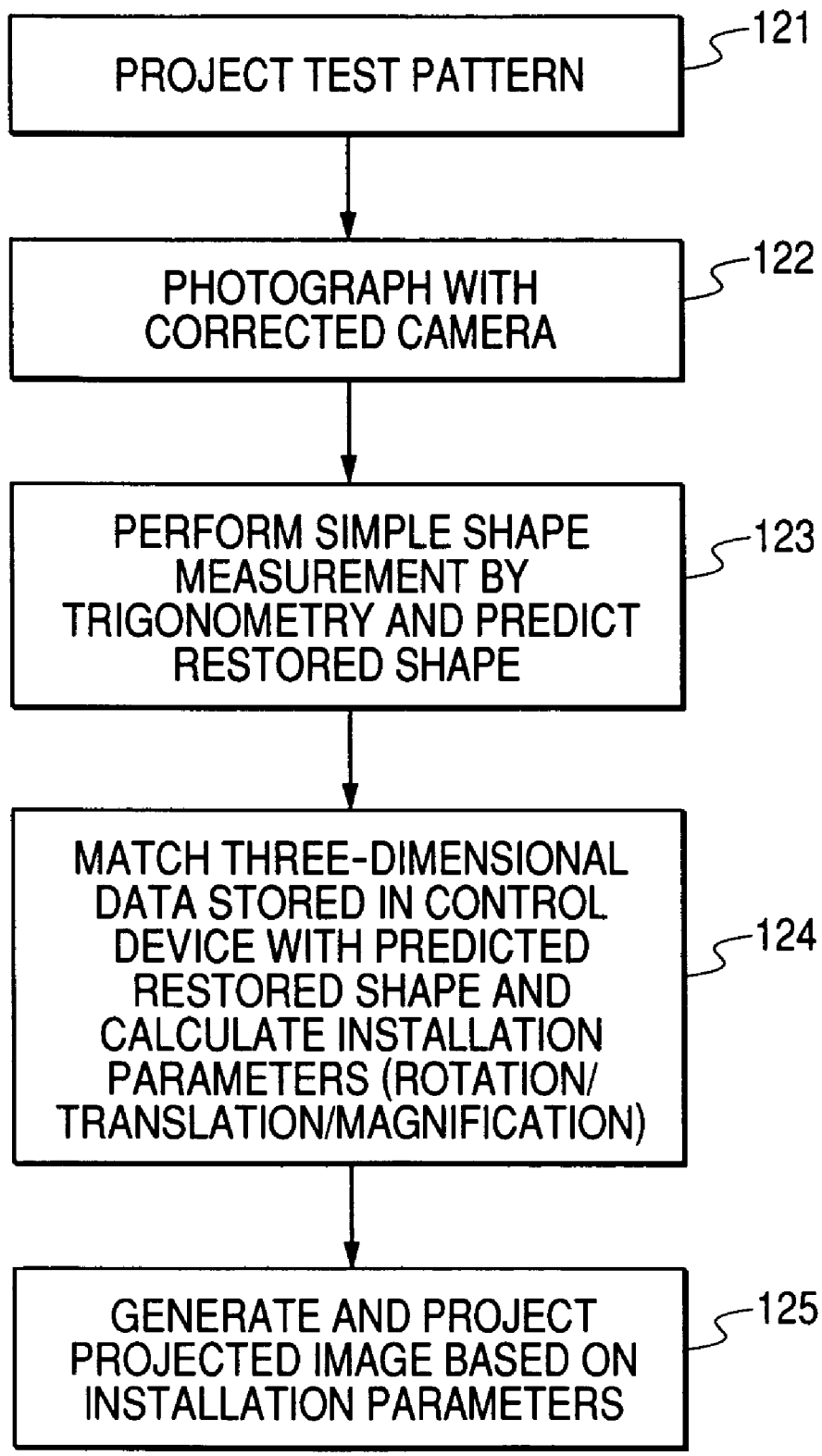
FIG. 12 is a flowchart illustrating a method of generating and projecting a projected image based on the installation parameters of the volumetric shape model.

FIG. 11 illustrates a method of obtaining the installation parameters (rotation, translation, and magnification) of the volumetric shape model. FIG. 12 is a flowchart illustrating a method of generating and projecting a projected image based on the installation parameters of the volumetric shape model. In FIG. 11, the projector 4 and a monitor camera 111 are previously corrected in the parameters of a projection lens and a photographing lens, respectively. The correction is performed using a lattice pattern correcting plate. Hereinafter, the flowchart of FIG. 12 will be described.

First, in a step 121, a previously prepared test pattern 112 is projected by the projector 4 within only a range of the S volumetric shape model 1. The test pattern 112 may be composed of, for example, a sheet of monochromic or color stripe pattern or a lattice pattern, or several sheets of gray code patterns. Since the shape need not be precisely measured, very rough pattern may be used.

Next, in a step 122, the volumetric shape model 1 onto which the test pattern 112 is projected by the projector 4 is photographed using the monitor camera 111. In a step 123, the photographed image is matched with the projected image by the control device (PC) 3 connected with the projector 4 and the monitor camera 111, and a simple shape measurement is performed by trigonometry. The control device 3 generates the volumetric shape model from the obtained shape measuring data in a step 124. A transformation matrix for transforming this shape model from a local coordinate system to a world coordinate system is calculated.

In the transformation matrix, when a coordinate represented by the world coordinate system denotes Po and a coordinate represented by the local coordinate system denotes P1, $$Po = RP1 + T$$

Here, R denotes rotation and extension/reduction matrix and T denotes a translation vector. For example, when three points which do not exist on a straight line are identical, R and T can be obtained as follows. Suppose that the coordinates of three points in the world coordinate system are Po1, Po2, and Po3 and the coordinate of the local coordinate system are P11, P12, and P13. First, in each coordinate system, $$\bar{x} = \frac{\bar{P}_2 - \bar{P}_1}{|\bar{P}_2 - \bar{P}_1|}$$

$$\bar{y}_u = (\bar{P}_3 - \bar{P}_1) - [(\bar{P}_3 - \bar{P}_1) \cdot \bar{x}]\bar{x}$$

$$\bar{y} = \frac{\bar{y}_u}{\bar{y}_u}$$

$$\bar{z} = \bar{x} \times \bar{y}$$

is calculated.

if $$R_i = [\bar{x}_l \bar{y}_l \bar{z}_l]$$

$$R_o = [\bar{x}_o \bar{y}_o \bar{z}_o],$$

the rotation and extension/reduction matrix R can be expressed by the following equation.

$$R = R_o R_1^{-1}$$

When the rotation and extension/reduction matrix R is obtained, the translation vector T can be expressed by the following equation.

$$T = \bar{P}_{o1} - R\bar{P}_n$$

As such, the rotation and extension/reduction matrix R and the translation vector T can be obtained. Next, in a step 125, the image information of the upper surface and the side surfaces of the volumetric shape model is generated from three-dimensional data of the volumetric shape model based on the installation parameters (rotation and extension/reduction matrix R and the translation vector T), the surface texture image of the upper surface is directly projected onto the volumetric shape model by the projector 4, and the surface texture images of the side surfaces are projected through the reflection mirrors. Thus, a high-precision texture without deviation of the projected image can be reproduced.

According to the present invention, the surface texture of the object can be efficiently represented on the volumetric shape model. In the present invention, since the surface texture images of the side surfaces of the volumetric shape model can be projected onto the volumetric shape model in addition to the surface texture image of the upper surface of the volumetric shape model and a high-precision texture image is generated and projected onto the volumetric shape model by the projector, more real volumetric display device can be obtained.

In the present invention, a three-dimensional model such as a three-dimensional CG is input to the control device (PC), the shape is restored to the volumetric shape model based on specific installation angle information, and the images of the upper surface and the side surfaces are generated based on this installation angle information and are projected by the projector. Here, the restored shape and the projected image of the volumetric shape model can be dynamically changed by interactively changing the installation angle information by the input device such as a mouse or a joystick connected to the control device.

Furthermore, by previously measuring and storing geometrical installation conditions of the projector, the volumetric shape model, and the reflection mirror in the control device as the installation parameters and processing the images by the control device based on the installation parameters, the images of the upper surface and the side surfaces can be projected by the projector with adequate magnifications, positions, and slopes. By projecting the previously prepared test pattern onto the volumetric shape model by the projector, calculating the installation parameters from the image photographed by the monitor camera, and processing the images by the control device based on the installation parameters, the images of the upper surface and the side surfaces can be projected by the projector with adequate magnifications, positions, and slopes. In addition, when photographing the surface texture of the actual object, the position, the slope, and the zoom magnification of the monitor camera is determined depending on the installation parameters.

The present invention relates to the volumetric display device, and more particularly, to the volumetric display device which projects a surface texture image of a volumetric shape model onto the volumetric shape model to perform volumetric display. Accordingly, the present invention has industrial applicability.

According to the present invention, it is possible to provide a volumetric display device which can efficiently represent a surface texture of an object on a volumetric shape model. Particularly, in the present invention, since the surface texture image of the side surface can be projected in addition to the surface texture image of the upper surface of the volumetric shape model, a volumetric display device suitable for the collaboration which is performed by many people can be realized. Also, in the present invention, since a high-precision texture image can be generated and projected onto the volumetric shape model by a projector, a more real volumetric display device can be obtained.

What is claimed is:

1. A volumetric display apparatus, comprising:
    a physical volumetric shape model having a side surface and an upper surface;
    a reflection mirror disposed at the side surface;
    a control device which stores image information of surface textures of the upper surface and the side surface; and
    a projector that projects a projection including a surface texture of an upper surface of a three-dimensional object and a surface texture of a side surface of the three-dimensional object;
    wherein the surface texture of the upper surface of the three-dimensional object is directly projected onto the upper surface of the physical volumetric shape model and the surface texture of the side surface of the three-dimensional object is projected onto the side surface of the physical volumetric shape model via the reflection mirror, based on the image information from the control device;
    wherein the reflection mirror is composed of a half mirror to allow the side surface of the physical volumetric shape model to be viewed through the reflection mirror.

2. The volumetric display apparatus according to claim 1, wherein the physical volumetric shape model includes a plurality of pins arranged in a matrix; and
    the plurality of pins are variable in height according to a control of the control device.

3. The volumetric display apparatus according to claim 2, wherein the plurality of pins include a material that diffuses and reflects light.

4. The volumetric display apparatus according to claim 1, wherein the physical volumetric shape model is a molding model.

5. The volumetric display apparatus according to claim 1, further comprising a plurality of other reflection mirrors arranged around the physical volumetric shape model, each having a reflection surface inclined at an angle to a vertical direction.

6. The volumetric display apparatus according to claim 5, wherein the reflection surface is inclined at an angle of 45 degree or less to the vertical direction.

7. The volumetric display apparatus according to claim 1, wherein the reflection mirror is disposed at a predetermined interval from the physical volumetric shape model.

8. The volumetric display apparatus according to claim 1, wherein the projection further includes surface textures of other side surfaces of the three-dimensional object; and the surface textures of the side surfaces of the three-dimensional object are disposed around the surface texture of the upper surface of the three-dimensional object.

9. The volumetric display apparatus according to claim 8, wherein the projection includes a black image apart from the surface textures of the upper surface and the side surfaces of the three-dimensional object.

10. The volumetric display apparatus according to claim 1, wherein the projector includes a telecentric projection optical lens.

11. The volumetric display apparatus according to claim 10, wherein the reflection surface of the reflection mirror is inclined at an angle of 45 degree to a vertical direction.

12. A volumetric display apparatus, comprising:
    a physical volumetric shape model including a shape varying element, the physical volumetric shape model having a side surface and an upper surface;
    a plurality of reflection mirrors disposed at respective side surfaces of the physical volumetric shape model, wherein each of the reflection mirror is composed of a half mirror to allow the side surface of the physical volumetric shape model to be viewed through the reflection mirror;
    a control device which stores shape information of the physical volumetric shape model and image information of surface textures of the upper surface and the side surface;
    a shape varying element driving device that drives the shape varying element based on the shape information; and
    a projector that projects a projection including a surface texture of an upper surface of a three-dimensional object and surface textures of four different side surfaces of the three-dimensional object;

wherein the surface texture of the upper surface of the three-dimensional object is directly projected onto the upper surface of the physical volumetric shape model and the surface textures of the four different sides surfaces are respectively projected onto four different side surfaces of the physical volumetric shape model via the respective reflection mirrors, based on the image information from the control device;

wherein the four different sides surfaces of the physical volumetric shape model include a front, a back, and two sides, the two sides provided opposite one another, and the front and back provided opposite one another.

13. The volumetric display device according to claim 12, wherein the control device includes an input device; and the images of the surface texture image and the shape of the physical volumetric shape model are dynamically changeable by changing the image information and the shape information by the input device.

14. A volumetric display apparatus, comprising:

a physical volumetric shape model having a side surface and an upper surface;

a plurality of reflection mirrors disposed at respective side surfaces of the physical volumetric shape model, wherein each of the reflection mirror is composed of a half mirror to allow the side surface of the physical volumetric shape model to be viewed through the reflection mirror;

a control device that stores shape information of the physical volumetric shape model and image information of surface textures of the upper surface and the side surface; and a projector that projects a projection including a surface texture of an upper surface of a three-dimensional object and surface textures of four different side surfaces of the three-dimensional object;

wherein the surface texture of the upper surface of the three-dimensional object is directly projected onto the upper surface of the physical volumetric shape model and the surface textures of the four different sides surfaces are respectively projected onto four different side surfaces of the physical volumetric shape model via the respective reflection mirrors, based on the image information from the control device;

wherein the control device stores a geometrical installation condition of the physical volumetric shape model as an installation parameter and controls the image information of the surface textures based on the installation parameter;

wherein the four different sides surfaces of the physical volumetric shape model include a front, a back, and two sides, the two sides provided opposite one another, and the front and back provided opposite one another.

15. The volumetric display device according to claim 14, further comprising a monitor camera;

wherein the shape of the physical volumetric shape model is measured by projecting a test pattern with the projector onto the physical volumetric shape model and taking an image of the test pattern with the monitor camera; and the installation parameter is obtained based on the stored shape information and the measured shape information.

16. The volumetric display device according to claim 14, wherein the installation parameter includes at least one of rotation, translation, and magnification of the physical volumetric shape model.

17. A volumetric display method, comprising:

projecting a surface texture of an upper surface of a three-dimensional object onto an upper surface of a physical volumetric shape model, based on image information of surface texture of the upper surface of the three-dimensional object; and projecting surface textures of four different side surfaces of the three-dimensional object respectively onto four different side surfaces of the physical volumetric shape model through respective reflection mirrors, based on image information of surface texture of the side surface;

wherein a projection including the surface texture of the upper surface of the three-dimensional object and the surface textures of the side surfaces of the three-dimensional object provided together is projected onto the physical volumetric shape model;

wherein the four different sides surfaces of the physical volumetric shape model include a front, a back, and two sides, the two sides provided opposite one another, and the front and back provided opposite one another.

18. The volumetric display method according to claim 17, wherein the surface textures of the upper surface and the side surfaces are individually controlled in at least one of a size, a projection position, and an inclination.

* * * * *